United States Patent Office 2,880,257
Patented Mar. 31, 1959

2,880,257

ALKALINE STORAGE BATTERY

Harold P. Murphy, Ridley Park, and Abraham L. Levine, Philadelphia, Pa., assignors to The Electric Storage Battery Company, a corporation of New Jersey No Drawing. Application March 27, 1956
Serial No. 574,338

3 Claims. (Cl. 136—29)

The invention relates to alkaline storage batteries and, more particularly to that type of alkaline battery that is completely sealed against the passage of gases.

During the operation of alkaline batteries, and particularly near the end of the charging operation, the positive and negative electrodes evolve oxygen and hydrogen respectively as a result of electrolytic decomposition of the water in the electrolyte. If these gases are permitted to escape, as is conventional practice, there is a resulting water depletion which requires constant servicing of the battery.

Sealed alkaline type batteries have, of course, heretofore been known to the art but a grave disadvantage has been that they are not readily chargeable at rates as high as would be desired for efficient operation since high rate charges result in an extreme build up of gas pressure within the battery.

It is therefore an object of the invention to provide electrodes for sealed alkaline batteries that can be charged at satisfactorily high rates.

Another object of the invention is to provide a process for preparing said electrodes, particularly in the impregnation of such plates and the formation of active material, that will be advantageous over known methods insofar as economy and ease of production are concerned.

In accordance with the invention there are provided plaques of highly microporous graphite that serve as matrices for the active material for either positive electrodes or negative electrodes as desired. These plaques can be prepared as disclosed in U.S. Patent No. 2,658,099, granted to L. P. Basset on November 3, 1953, by mixing a leachable filler, such as salt, with clay and tar. The mixture is kneaded and volatiles distilled off at elevated temperatures, following which the material is cold ground, molded, heated, and the filler leached out to give the desired porosity. The shaped porous articles is then treated at extremely high temperatures to convert the porous carbon to desired porous graphite matrix. It will be understood that other methods of producing porous graphite can be used but, due to the purity of the graphite thereby produced and the fineness and number of pores, the method disclosed in said patent has been found to be highly suitable.

Heretofore, as shown in the Basset patent, it has been common practice to impregnate these plaques, and also sintered porous nickel plaques as positive electrodes by a nickel nitrate solution, the plaques then being electrolyzed or otherwise treated to produce an active material generally in the form of a nickel oxide within the pores thereof. In the case of the negative electrode, the active material is metallic cadmium produced from an impregnating solution of cadmium nitrate which has then been electrolyzed.

It has been found, however, that it is desirable for the metal which is to become the active material to exist as a metal formate, either initially or at some stage during the processing. This can be accomplished in several various ways which will be hereinafter described and which are intended to be within the scope of the claims appended hereto.

According to one procedure, the porous plaque, which for purposes of our process may be either graphite or sintered nickel is placed within an autoclave and subjected to a high degree of vacuum, in the nature of 99% of a perfect vacuum, thereby removing all occluded air from the pores of the plaque. A 10% to 20% solution of the desired metal formate is then introduced into the autoclave, which solution enters into the pores of the plaque. In the case of positive electrodes, the solution can be nickel formate, $Ni(COOH)_2$, and, if negative electrodes are to be produced the solution may consist of cadmium formate, $Cd(COOH)$. If desired, the initial introduction of the solution into the pores can be accelerated by release of the vacuum and application of atmospheric pressure.

Following the above procedure, the plate is permitted to drain and is then dried at about 200° to 212° F. A thermal treatment at about 400° to 410° F. decomposes the metal formate to nickel oxide, $Ni_2O_3$ according to the following reaction:

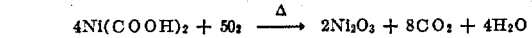
$$4Ni(COOH)_2 + 5O_2 \xrightarrow{\Delta} 2Ni_2O_3 + 8CO_2 + 4H_2O$$

as shown by the free oxygen in the above equation, the the reaction is carried out in an oxidizing atmosphere. If an inert atmosphere is used the reaction will be:

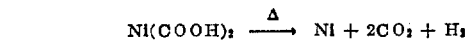
$$Ni(COOH)_2 \xrightarrow{\Delta} Ni + 2CO_2 + H_2$$

A subsequent charge will oxidize the metallic nickel to the active form that is desired in a positive plate.

The above cycle is repeated until the pores of the matrix are filled to an optimum extent, generally in the nature of about 35%.

From the standpoint of ease of impregnation of the plaque it is preferable to impregnate initially with a solution of nickel nitrate, $Ni(NO_3)_2$, or cadmium nitrate, $Cd(NO_3)_2$. Hence, more material will be deposited within the pores of the plaque per impregnation cycle thereby decreasing the number of impregnation cycles necessary for optimum filling of the pores. The plaque is then suspended in a closed chamber containing vapors of an aqueous formaldehyde solution or an aqueous formic acid solution. The temperature is raised to about 160° F., at which point the metal nitrate will be converted to metal formate according to the following reaction where formic acid is used:

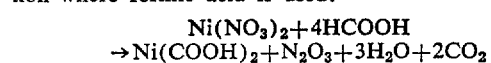
$$Ni(NO_3)_2 + 4HCOOH$$
$$\rightarrow Ni(COOH)_2 + N_2O_3 + 3H_2O + 2CO_2$$

The carbon dioxide is prevented from reacting with the nickel formate to form nickel carbonate by the presence of excess formic acid vapors.

Having produced the desired metal formate, it can then be thermally decomposed to form the desired active material as described hereinbefore. In the alternative the following procedure could also be carried out to reach the desired result.

After the reaction that produced the nickel formate, and without drying, the plaque is subjected to an atmosphere of water vapor and ammonia, $NH_3$. As a result of the reaction between such atmosphere and the nickel formate, the latter is converted to nickel hydrate, $Ni(OH)_2$ and ammonium formate $(NH_4COOH)$ in accordance with the following:

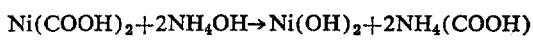
$$Ni(COOH)_2 + 2NH_4OH \rightarrow Ni(OH)_2 + 2NH_4(COOH)$$

At this point, the plaque is heated to about 240° F. and the pressure reduced to about one tenth of an atmosphere. Under these conditions the ammonium formate will be distilled off leaving the plaque impregnated with nickel hydrate alone. The cycle can then be repeated as desired to provide optimum impregnation of the plaque.

The above disclosed methods involving merely impregnation and chemical reactions are highly to be preferred over conventional methods. Generally, following impregnation of the plaque with a solution of nickel nitrate or nickel chloride, the metal salt is converted to active material by electrolysis, a process that is time consuming and requires extensive and careful handling. The disadvantages of such procedure are obvious and are completely obviated by the process carried out in accordance with the invention.

It will be seen, therefore, that we have accomplished the objects of the invention, namely, to provide new and improved electrodes for sealed alkaline batteries and to provide a new and improved process of impregnating such electrodes.

We claim:

1. A method of producing battery electrodes comprising the steps of impregnating a porous matrix selected from a group consisting of sintered nickel and graphite with a solution of a metal nitrate, reacting said metal nitrate with a solution of reactant selected from the group consisting of formaldehyde and formic acid to form a metal formate, and thermally decomposing said metal formate in an oxidizing atmosphere to form electrochemically active material within said matrix.

2. A method of producing battery electrodes comprising the steps of impregnating a porous matrix selected from a group consisting of sintered nickel and graphite with a solution of a metal nitrate, reacting said metal nitrate with an aqueous solution of reactant selected from the group consisting of formaldehyde and formic acid to form a metal formate, subjecting said matrix to ammonia vapors to produce a metal hydrate and ammonium formate, and distilling off said formate under conditions of elevated temperature and reduced pressure.

3. A method of producing battery electrodes comprising the steps of impregnating a porous graphite matrix with a solution of nickel nitrate, reacting said nitrate with an aqueous solution of a reactant selected from the group consisting of formaldehyde and formic acid, subjecting said matrix to ammonia vapors to produce nickel hydrate and ammonium formate, and distilling off said formate under conditions of elevated temperature and reduced pressure.

References Cited in the file of this patent
UNITED STATES PATENTS

| | | |
|---|---|---|
| 1,988,861 | Thorausch | Jan. 22, 1935 |
| 2,626,294 | Brennan | Jan. 20, 1953 |
| 2,646,455 | Jeannin | July 21, 1953 |
| 2,658,099 | Basset | Nov. 3, 1953 |
| 2,737,541 | Coolidge | Mar. 6, 1956 |